United States Patent [19]

McCoy

[11] 4,340,829

[45] Jul. 20, 1982

[54] MOLDED END COIL INSULATOR

[75] Inventor: Billy R. McCoy, Jackson, Tenn.

[73] Assignee: Sheller Globe Corporation, Cleveland, Ohio

[21] Appl. No.: 51,051

[22] Filed: Jun. 22, 1979

[51] Int. Cl.³ .............................................. H02K 11/00
[52] U.S. Cl. ........................................ 310/71; 310/51; 310/194; 339/97 R
[58] Field of Search ................. 310/71, 194, 215, 216, 310/260, 43, 42, 51, 214, 45; 339/95 D, 97 R; 336/100, 107, 192

[56] References Cited

U.S. PATENT DOCUMENTS

| | | | |
|---|---|---|---|
| 2,631,251 | 3/1953 | Spielman | 310/42 |
| 3,725,707 | 4/1973 | Leimbach | 310/71 |
| 3,768,152 | 10/1973 | Swanke | 310/43 |
| 3,861,026 | 1/1975 | Swaim | 310/215 |
| 3,979,615 | 9/1976 | Neff | 310/71 |
| 4,038,573 | 7/1977 | Hillyer | 310/71 |
| 4,056,749 | 11/1977 | Carlson | 310/71 |
| 4,130,331 | 12/1978 | Neff | 339/97 R |
| 4,133,595 | 1/1979 | Pritulsky | 339/95 D |

*Primary Examiner*—R. Skudy

*Attorney, Agent, or Firm*—Yount & Tarolli

[57] ABSTRACT

A molded end coil insulator designed for attachment to a ferromagnetic core and which forms part of the ground insulation for magnet wires wound thereabout and about a series of pole pieces formed on the core. The end coil insulator includes features which improve the adaptability of the resulting device to automated winding of the magnet wires and connection of lead wires from an external circuit with the magnet wires. One such feature is an improved terminal support which receives and retains a terminal member in good electrical contact with a magnet wire, and which positively grips a lead wire from an external circuit in such a manner that a section of the lead wire connected with the terminal member is effectively isolated from strains and vibrations in the external circuit. Another feature of the molded end coil insulator is structure for positively restraining and guiding crossover sections of magnet wires which extend between the pole pieces. Still further features of the end coil insulator are its design for good heat transfer contact with the core, and its structure for retaining sheets of insulating material in openings in the core between the pole pieces.

14 Claims, 8 Drawing Figures

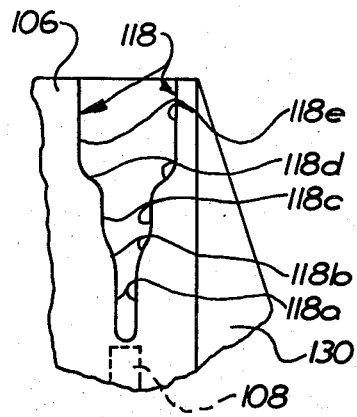
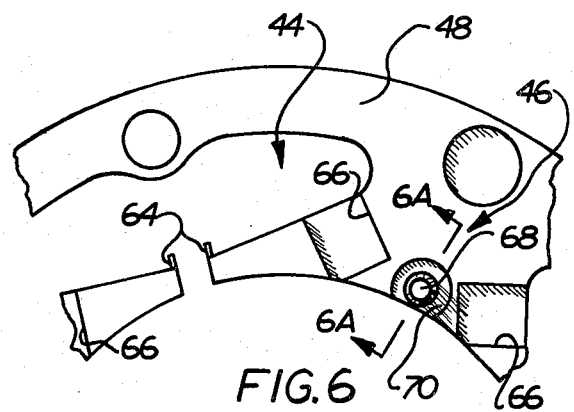
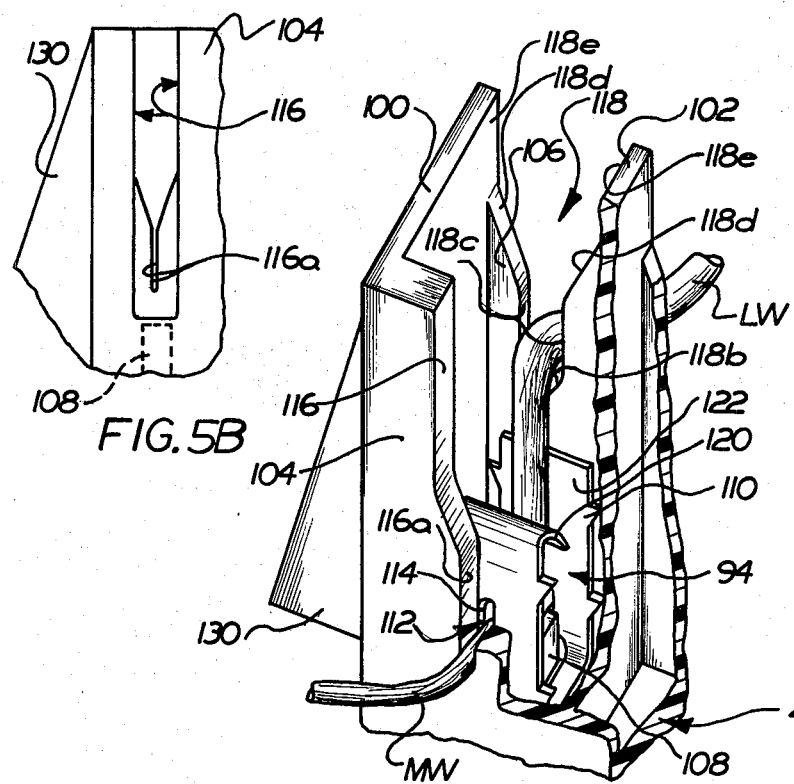
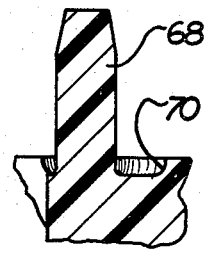

MOLDED END COIL INSULATOR

FIELD OF THE INVENTION

This invention relates generally to an end coil insulator forming part of an electromagnetic device. It relates particularly a molded end coil insulator designed for attachment to a ferromagnetic core to form part of the ground insulation for magnet wires wound thereabout.

BACKGROUND OF THE INVENTION

In known electromagnetic motor constructions a magnetic flux is created by current flowing about ferromagnetic pole pieces of a stator. The magnetic flux is directed across a movable armature to operate the motor.

In a known stator construction for an electromagnetic motor a stack of laminations of ferromagnetic material are fixed together to form a core having a series of pole pieces. After the core is covered by a layer of ground insulation magnet wires are wound about the pole pieces in a predetermined pattern depending upon the nature and direction of the magnetic flux to be created. The magnetic flux is then generated by electric current supplied to the magnet wires through lead wires connecting the magnet wires with an external circuit.

It has been found desirable to automate the winding of magnet wires about the ferromagnetic core, and the attaching of lead wires to the magnet wires. Consequently, some recent prior art disclosures have been directed toward structures and methods designed to facilitate automated winding of magnet wires about a ferromagnetic core and for attaching external lead wires to the magnet wires.

One type of structure designed to facilitate automated winding of magnet wires and attachment of external lead wires is an end coil insulator. It comprises a molded structure of insulating material designed for attachment to each end face of the ferromagnetic core before the magnet wires are wound thereabout. Along with sheets of insulating material disposed between the pole pieces of the core it forms the ground insulation for the magnet wires. The molded structure is configured to support the windings of magnet wires in predetermined positions relative to the pole pieces. The molded structure also includes one or more terminal supports which are each designed to retain and support a terminal member which connects a external lead wire with a magnet wire.

U.S. Pat. No. 3,979,615 discloses such an end coil insulator. The end coil insulator is a molded structure comprising a platelike member with a surface which engages an end face of the ferromagnetic core. The molded structure also includes a tubular retaining element for confining magnet wires wound about the pole pieces of the core, and a series of terminal supports, each of which is designed to receive and retain a respective terminal member to connect the magnet wires with the external lead wires.

In U.S. Pat. No. 3,979,615, a terminal support and its respective terminal member are specially constructed so that as they are assembled with a magnet wire they cooperate to strip insulation from the magnet wire and make good electrical contact between the magnet wire and the terminal member. The terminal member is further designed with a specially constructed resilient lip for engaging an end of an external lead wire in such an manner that as the lead wire is inserted into the lip insulation is stripped from the end of the lead wire to provide good contact between the lead wire and the terminal member. The patent suggests that the disclosed form of connection of the lead wire with the terminal member is sufficient to avoid the need for soldering the lead wire to the terminal member. U.S. Pat. No. 3,861,026 discloses another type of construction for an end coil insulator. The patent discloses an end coil insulator molded in situ against each end face of a ferromagnetic core. The end coil insulator includes integral flanges extending away from the core and which retain the magnet wires wound about the pole pieces against undesirable amounts of displacement toward or away from the center of the core. The end coil insulator further includes terminal supports for receiving pronged terminals which connect the magnet wires with an external circuit.

U.S. Pat. No. 3,725,707 discloses a stator construction in which specially shaped terminal blocks are designed for attachment to each of the pole pieces after the magnet wires have been wound thereabout. The terminal blocks support terminal members with special receptacles which are designed to be connected to the magnet wires preferably by a mechanical operation such as crimping, and which are further designed to receive an external lead wire for connecting an external lead to the magnet wire coils.

SUMMARY OF THE INVENTION

The present invention relates to a molded end coil insulator structure designed for attachment at each end of a ferromagnetic core before the magnet wires are wound thereabout, and which is believed to improve upon the concepts of prior art end coil insulators such as shown in U.S. Pat. Nos. 3,861,026 and 3,979,615, particularly, when used in an automated process.

The molded end coil insulator of the present invention is also designed to offer design flexibility when used to construct a stator. The end coil insulator is designed so that the resulting stator can accommodate various different types of magnet wire winding patterns, and yet in a manner in which the magnet wires will be firmly retained in place, and readily connected with the lead wires.

A particular area in which the present invention improves upon the prior art concepts is in the terminal support which receives and retains a terminal member which interconnects a magnet wire with an external lead wire. Not only is the terminal support designed to cooperate with the terminal member and magnet wire so as to make good electrical contact therebetween, but the terminal support is further designed to positively grip the lead wire at a point spaced from the point at which the lead wire is connected with the terminal member in such a manner that it isolates the section of the lead wire connected with the terminal member from strains and vibrations in the external circuit.

Another feature of the end coil insulator invention is structure which grips and guides crossover magnet wires which extend between the pole pieces. In the preferred embodiment, the molded end coil insulator forms an integral guide for case bolts interconnecting the end coil insulator with the core. An integral lip spaced closely from an external surface of the case bolt guide forms a slot which grips and guides crossover wires and maintains the crossover wires in proper positions on the core.

A further feature of the molded invention is that the same molded end coil insulator can be attached to either end face of the core, and its design is such that good surface contact of the end coil insulator with the core is provided in order to dissipate heat.

BRIEF DESCRIPTION OF THE DRAWINGS

The further features of the present invention will become further apparent from the following detailed description and the accompanying drawings wherein:

FIG. 4 is a fragmentary perspective view of a terminal support in an end coil insulator according to the invention, with portions broken away, and showing a terminal member, a magnet wire and a lead wire supported thereon;

FIGS. 5A and 5B are views of opposed walls of a terminal support in an end coil insulator according to the invention;

FIG. 6 is a fragmentary view of the surface of the end coil insulator of the invention which abuts the ferromagnetic core; and FIG. 6A is a sectional view of a portion of the end coil insulator of FIG. 6, taken along the line 6A—6A.

DETAILED DESCRIPTION OF THE PREFERRED EMBODIMENT

As discussed above, the present invention relates to a molded end coil insulator which forms part of the ground insulation for a stator in which magnet wires are wound about a ferromagnetic core. In constructing such a stator, the molded end coil insulator, and an insulating sheet are assembled with the ferromagnetic core before the magnet wires are wound thereabout. The magnet wires are then wound about the end coil insulator, the insulating sheet and the core in a predetermined direction depending upon the nature and pattern of the magnetic flux which is to be created by the stator. A series of lead wires connect the magnet wires with an external circuit.

Figure 1:
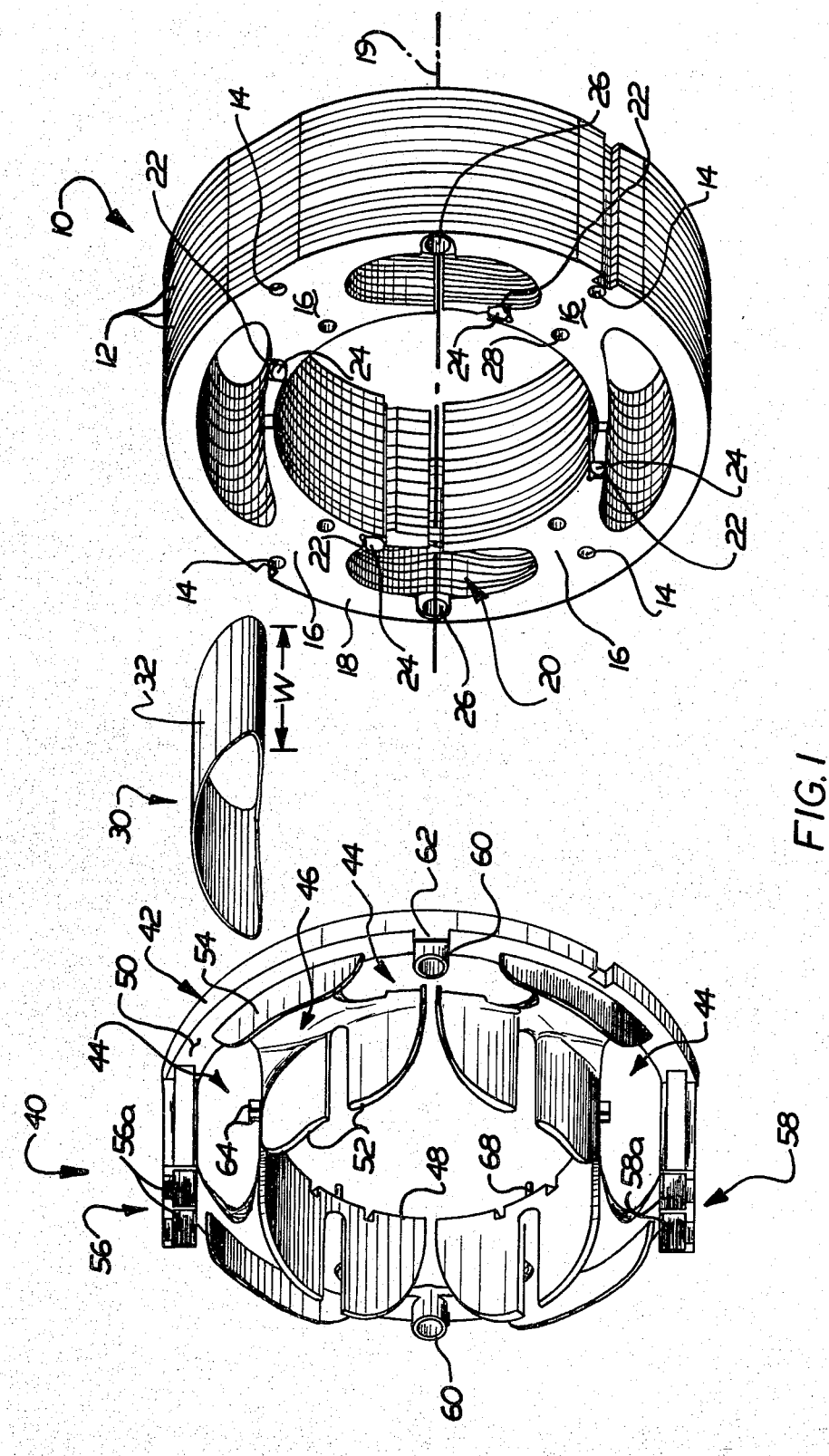
FIG. 1 is an exploded view of a ferromagnetic core, an insulating sleeve, and an end coil insulator according to the present invention in an unassembled condition.

Referring to FIG. 1, a typical ferromagnetic core 10 includes a series of circular plate like laminations 12 of ferromagnetic material fixed together by a series of studs or rivets 14. As shown, the core 10 defines four (4) pole pieces 16 extending through the core (i.e., from one end face 18 of the core to the other end face, not shown). The pole pieces 16 are circumferentially spaced about the central axis 19 of the core, and are separated by openings 20 extending through the core.

The laminations 12 define a slot 22 in each of the pole pieces 16. Each slot 22 extends through the core 10. Each slot 22 supports and retains a shading element 24 which also extends through the core. The shading elements 24, preferably formed of copper, protrude slightly outwardly of each of the end faces of the core.

The laminations 12 further form a pair of openings 26 which extend through the core. The openings 26 are for a series of case bolts (not shown) which pass through the end coil insulator and the core. In an electromagnetic motor, such case bolts hold the entire motor structure together.

Further, the core 10 includes a series of recesses 28 in each end face. The recesses 28 are dimensioned to engage guide pins on the end coil insulator to couple the end coil insulator the core, as described more fully hereinafter.

An insulating sleeve 30 is designed to be inserted in each opening 20 in the core 10. The insulating sleeve 30 is preferably comprised of a sheet 32 of flexible, pliable, thermoplastic polyester material formed into a shape corresponding to each of the openings 20. The width W of the plastic sheet 32 is preferably such that when inserted in an opening 20 in the core 10 the end portions of the sheet 32 protrude slightly outward of the end surfaces of the core 10.

Of course, while one insulating sleeve 30 is shown in FIG. 1 it will be apparent that a separate insulating sleeve is provided for each opening 20 in the core. The sheet 32 forming each sleeve is compliant enough so that when the magnet wires are wound thereabout and about the pole pieces of the core they compress the sleeve 30 against the core.

An end coil insulator 40 constructed according to the present invention is designed for attachment to each end face of the core 10. FIG. 1 shows one end coil insulator 40 for attachment to the end face 18 of the core 10. In attaching the end coil insulator 40 to the core 10 a series of guide pins 68 on the end coil insulator are dimensioned to engage the recesses 28 in the core in an interference fit. This helps to firmly anchor the end coil insulator 40 to the core 10. In forming a stator an identical end coil insulator or any similar type of end coil insulator can be attached to the opposite end face of the core 10.

The end coil insulator 40 is a molded body. It is preferably formed of glass fiber reinforced thermoplastic polyester which is molded into the desired shape.

The end coil insulator 40 includes a plate-like member 42 having a generally annular shape corresponding to the annular shape of the end face 18 of the core. The plate-like member 42 defines a series of openings 44 of a generally similar configuration as the openings 20 in the core, and a series of solid portions 46 of a similar shape as the pole pieces 16. When the end coil insulator 40 is engaged with the core 10 the openings 44 are aligned with the openings 20 of the core, and the portions 46 overlie the pole pieces 16.

The plate-like member 42 has an under surface 48 designed to engage the end face 18 of the core in good heat transfer relation therewith. The plate-like member 42 also has an outer surface 50 and a number of integral elements extending outwardly therefrom (i.e., away from the core 10).

The integral elements extending outwardly from the plate-like member 42 include inner flanges 52 and outer flanges 54 at the radially inner and outer ends, respectively, of the solid portions 46 of the end coil insulator which overly the pole pieces 16. Those flanges 52, 54 cooperate to maintain magnet wires wound about the pole pieces 16 within a desired radial distance of the central axis 19 of the core (FIG. 2), in a manner similar to that disclosed in U.S. Pat. No. 3,861,026.

The molded end coil insulator 40 includes a first pair of terminal supports 56 and a second pair of terminal supports 58. The terminal supports 56 each includes respective walls forming an opening 56a for receiving a terminal member and the terminal supports 58 each includes respective walls forming an opening 58a for receiving a terminal member, as described more fully hereinafter.

The molded end coil insulator 49 includes a pair of cylindrical tubular members 60 extending outwardly of surface 50. The cylindrical tubular members 60 support and guide case bolts which extend therethrough and through the holes 26 in the core in holding the entire motor assembly together. An integral flange 62 spaced from the outer surface of each of the cylindrical members cooperates therewith to grip and guide crossover magnet wires in a manner described hereinafter.

Figure 3:
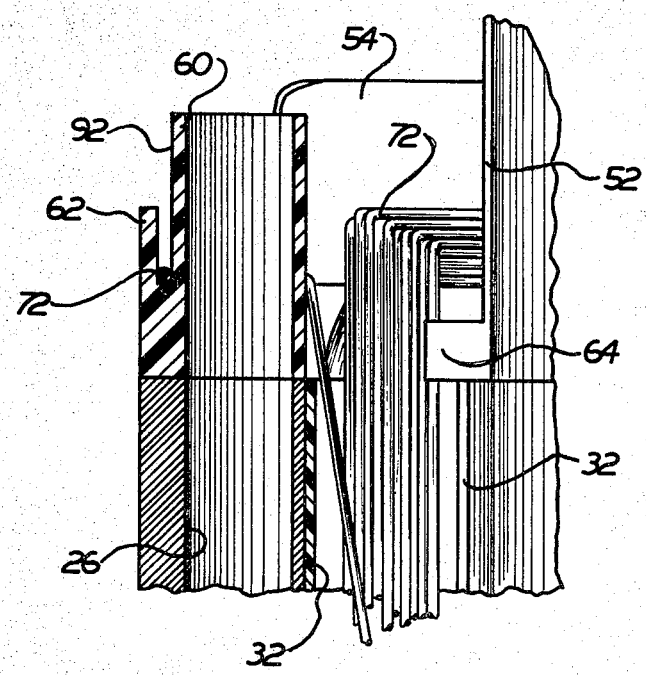
FIG. 3 is a sectional view of the stator of FIG. 2 taken along the lines 3—3 of FIG. 2.

As set forth above, the plate-like member 42 includes openings 44 in the general configuration of the slots 20 in the ferromagnetic core 10. Formed integrally with the end coil insulator and extending generally into each of the openings 44 are a pair of retaining tips 64 (FIG. 6). The retaining tips 64 are structured so that they overly edges of the insulating sleeve 30 in the associated holes 20 of the core when the end coil insulator and the insulating sleeves are assembled with a core (FIG. 3). The retaining tips 64 serve to positively retain the insulating sleeves 30 against accidental dislodgment from the slots 20.

A series of rectangular recesses 66 are formed in the under surface 48 of the molded end coil insulator. Two such recesses 66 are located in the under surface of each portion 46 of the end coil insulator which overlies one of the pole pieces of the core 10. The recesses are disposed to receive the tips of the shading pieces 24 extending outwardly of the end surfaces of the core. Thus, the shading pieces do not interfere with the remainder of the under surface 48 of the end coil insulator having good surface contact with an end face of the core. The two recesses 66 associated with each portion 46 of the end coil insulator overlying a pole pieces, help insure that the same molded end coil insulator can engage either end face of the core without interference from the protruding shading pieces.

The guide pins 68 protrude outwardly from the under surface 48 of the end coil insulator (FIGS. 1, 6, 6A). The guide pins 68 are dimensioned to engage the recesses 28 in the end face of the core in an interference fit. This helps orient the end coil insulator 40 properly on the core 10 and also helps maintain the end coil insulator in tight engagement with the core.

A circumferential recess 70 in under surface 48 surrounds each guide pin 68. The recesses 70 are for collecting shavings which may occur as the guide pins 68 engage the recesses 28 in an interference fit. Thus, any such shavings are not likely to impair good surface contact between the under surface 48 of the end coil insulator and the core.

With an end coil insulator connected with each end face of the core and an insulating sheet 30 in each opening 20 in the core, the magnet wires can be wound about the end coil insulators, the core and the insulating sheets in a predetermined pattern according to the type of motor desired. Winding of the magnet wires is effected by automatic machinery of a type which is known in the art for this purpose.

Figure 2:
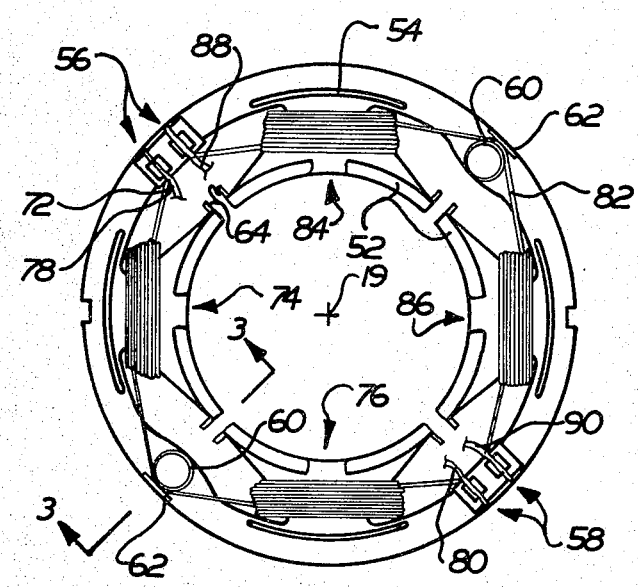
FIG. 2 is a top view of a stator having an end coil insulator according to the invention assembled therewith and with the magnet wires wound thereabout and lead wires attached thereto.

FIG. 2 shows a winding pattern for a four-pole series connected motor. A magnet wire 72 connected with a terminal in one of the supports 56 is wound around one of the pole pieces and the covering portion 46 of the end coil insulator to form a first pole 74. The magnet wire 72 is guided through the crossover magnet wire guide formed by lip 62 and the outer surface of one of the case bolt guides 60 and is then wound around another pole piece and the covering portion of the end coil insulator to form a second pole 76. The magnet wire is connected with a terminal in one of the supports 58. Lead wires 78, 80 are connected with the terminals in the above-mentioned slots 56, 58.

Similarly, another magnet wire 82 is connected with terminals in the other support 56 and 58 and is wound about a pair of pole pieces and the covering portions of the end coil insulator to form an additional pair of poles 84, 86. Lead wires 88, 90 are connected with the respective terminals in those support terminals.

In the motor of FIG. 2 the lead wires associated with one pair of terminals, for example the lead wires 78, 88, would connect the magnet wires in an external circuit. The lead wires 80, 90 would be connected with a thermal protector.

Of course the manner in which the magnet wires are wound, and the manner in which the lead wires are connected externally of the terminal supports, may vary, according to the type of motor being constructed. In a multi-speed motor, the magnet and lead wires may be connected with terminal supports and associated terminals of end coil insulators attached to both end faces of the core 10.

Referring to FIG. 3, the upstanding lip 62 and an outer surface 92 of the case bolt guide 60 cooperate to grip and guide the crossover portion of each magnet wire which extends between the poles. Downward pressure on the magnet wire urges the magnet wire into the space between the lip 62 and the surface 92. The spacing of the lip 62 from the surface 92 is close enough so that the magnet wire is restrained, or even lightly gripped, to resist accidental dislodgment of the magnet wire.

Of course, it should be clear that there are numerous other patterns for winding magnet wires on the core in which the cross over wire guides may be employed to secure the crossover wires on the end coil insulator in a precise location.

As noted above, there are two terminal supports 56 and two other terminal supports 58 on the end coil insulator. Each of those terminal supports has a similar construction to the terminal support of FIG. 4 which is shown coupling a terminal 94, a magnet wire MW and a lead wire LW.

In FIG. 4 the terminal support includes two walls 100, 102 having flat surfaces in facing relation with each other. Two other opposed walls 104 and 106 (also shown in FIGS. 5A and 5B) have specially formed slots for engaging the magnet wire MW and a lead wire LW in a manner discussed more fully hereinafter. The plate-like member 42 closes an inward end of the terminal support. The walls 100, 102, 104 and 106 define an outward extending opening terminal support. The terminal support also includes a raised block 108 at its inward end.

FIG. 4 shows terminal member 94 after it has been received in the terminal support. As the terminal member is inserted into the terminal support, a series of locking teeth 110 engaging the walls of the terminal support to resist dislodgement of the terminal member. The terminal member 94 includes slot 112 opening toward the inward end of the terminal support. The slot 112 includes opposed parallel surfaces 114 which are spaced apart by less than the diameter of the insulated magnet wire MW.

The wall 104 of the terminal support includes opposed surfaces 116 defining an outwardly opening slot (FIGS. 4, 5B). This slot includes spaced apart inner most wall portions 116a which are spaced apart by less than the cross sectional diameter of the magnet wire MW.

The wall 106 includes opposed surfaces 118 also defining an outwardly opening slot (FIGS. 4 and 5A). The opposed surfaces 118 have inwardmost parallel portions 118a spaced apart to support the magnet wire MW therebetween. A pair of diverging portions 118b converge outwardly from parallel portions 118a and are connected with another pair of parallel portions 118c which are spaced apart by a distance less than the cross sectional diameter of the lead wire LW. Still further, the parallel portions 118c are connected with diverging portions 118d, and these portions in turn connect with parallel portions 118e which form an opening which is greater than the cross sectional diameter of the lead wire LW.

In assembling the magnet wire MW, the terminal 94 and the lead wire LW, the magnet wire MW is first laid across the slots 116, 118 in walls 104, 106. Movement of the terminal member 94 inwardly into the terminal support clamps the magnet wire MW against the top of the block 108 and forces the magnet wire MW relatively upwardly into the narrow slot 112 in the terminal member 94. Since the walls of this slot are spaced apart by less than the diameter of the magnet wire, insulation is stripped from the magnet wire and good contact is provided between the terminal 94 and the magnet wire. Further positive gripping of the magnet wire is provided as the magnet wire is forced inwardly because it is also forced between whichever of the pairs of surfaces 116a, 118a in the opposed housing walls which are spaced apart by less than its diameter.

The lead wire LW is forced into a narrow opening between a resilient lip 120 and a wall 122 of the terminal member 94. The lip 120 includes a pair of converging edges (not shown) which cooperate in a manner disclosed in U.S. Pat. No. 3,979,615 to insure that as it is inserted into the terminal member the insulation is stripped from the lead wire and good contact is made between the lead wire and the terminal member.

In accordance with the present invention, the lead wire LW is further gripped in an interference fit between the surface portions 118c of the opposed surfaces 118. This occurs by the lead wire being forced inwardly through the slot formed by the opposed surfaces 118. The lead wire LW is thus positively gripped by the surface portions 118c so that a section of the lead wire is supported on the terminal support. This has the effect of isolating that section of the lead wire, which is also connected with the terminal 94, from strains and vibrations in the external circuit, particularly during assembly or operation of the motor. Such strains and vibrations might otherwise loosen the connection of the lead wire from the terminal 94.

The wide opening formed by the surface portions 118e makes it relatively easy for the lead wire to be guided into the slot formed by the opposing surfaces 118. The surface portions 118e are spaced apart by a distance such for a certain class of larger diameter lead wires, they grip the lead wire in an interference fit to isolate the lead wire from strains vibrations in the external circuit.

As seen in FIG. 4, the terminal support is designed such the that surface portions 118c and the surface portions 118e which engage the lead wire extend outwardly beyond the terminal member 94. This makes it relatively easy for the section of lead wire to be forced into interference fit with the surface portions 118c or the surface portions 118e by means of automated machinery.

As shown in FIG. 4 a wedge shaped wall 130 is connected with wall 100. This provides some stiffening of the terminal support, but also permits some flexibility in the outermost portion of the slots 116, 118 in the terminal walls. This construction has the effect of stiffening the walls of the terminal support providing the interference fit for the lead wire to a degree that they maintain a good positive gripping action on the lead wire. The lead wire can be connected in an external circuit to apply current to the magnet wire, and the section of the lead wire within the terminal housing is then isolated from vibrations in the external circuit.

Thus, it is believed that applicant has provided a significantly improved end coil insulator structure for an electromagnetic device.

Having described one specific preferred embodiment of the invention, the following is claimed:

1. A molded end coil insulator for attachment to an end face of a ferromagnetic core to form part of the ground insulation for magnet wires wound thereabout and about the core, said molded end coil insulator comprising a molded body having a surface configured to engage a surface of the ferromagnetic core, said molded body including one or more terminal supports each of which is configured to receive and retain a terminal member and a magnet wire in good electrical contact with each other, each of said terminal supports being further configured to grip a lead wire from an external circuit and connected with the terminal member to isolate a section of the lead wire connected with the terminal member from strains and vibrations in the external circuit, each terminal support comprising a pair of facing surfaces which are spaced apart by a distance less than the diameter of the lead wire for engaging the lead wire in an interference fit to isolate the section of lead wire from strains and vibrations in the external circuit.

2. A molded end coil insulator as defined in claim 1 wherein said molded body comprises a plate-like portion having one surface configured to engage the surface of the ferromagnetic core, each terminal support comprising a plurality of walls extending away from the other surface of said plate-like portion and defining an open ended receptacle for receiving and supporting a terminal member, said plurality of walls including a pair of spaced apart walls each having outwardly extending slots, said outwardly extending slots having opposed surfaces configured to receive a magnet wire and to support the magnet wire in a position for engaging an inwardly directed slot in the terminal member for making good electrical contact between the magnet wire and the terminal member, one of said outwardly extending slots extending outwardly beyond the terminal member and defining the facing surfaces for engaging the lead wire in an interference fit.

3. A molded end coil insulator as defined in claim 2 wherein the opposed surfaces of said one of said slots defines an enlarged opening outwardly of said facing surfaces for guiding the lead wire into said slot and between said facing surfaces.

4. A molded end coil insulator as defined in any of claims 1, 2 or 3 wherein said molded body comprises fiber reinforced thermoplastic polyester material.

5. A molded end coil insulator structure for use with a ferromagnetic core formed by a series of laminations of ferromagnetic material fixed together to define a pair of end faces and a series of pole pieces with openings therebetween surrounding a central axis, said molded end coil insulator structure being designed for attachment to either end face of the core and forming part of the ground insulation for magnet wires wound thereabout and about the pole pieces, said molded end coil insulator structure comprising a molded body including a plate-like portion having a surface for engaging either end face of the core in good heat transfer relationship therewith, said plate-like portion defining openings for aligning with the openings in the core and solid portions in the configuration of the pole pieces for overlying the pole pieces when the molded body is in engagement with either of the end faces of the core, said molded body including a terminal support for retaining a terminal member in good electrical contact with a magnet wire and for gripping a lead wire from an external circuit which is also in good electrical contact with the terminal member, said molded body including means for maintaining the magnet wire wound about the pole pieces in a predetermined disposition relative to the central axis of the core, said molded body further including means for positively restraining crossover sections of magnet wire extending between the pole pieces.

6. A molded end coil insulator structure as defined in claim 5 wherein said molded body includes one or more retaining members means extending inwardly from the openings in said plate-like portion to retain insulating sheets disposed in the openings in the core against accidental dislodgment from the core.

7. A molded end coil insulator structure as defined in either of claims 5 or 6 wherein said terminal support comprises a pair of facing surfaces which are spaced apart by a distance less than the diameter of the lead wire for engaging the lead wire in an interference fit to isolate the section of lead wire connected with the terminal member from strains and vibrations in the external circuit.

8. A molded end coil insulator structure as defined in claim 7 wherein said molded body comprises a plate-like portion having one surface configured to engage either end face of the ferromagnetic core, each terminal support comprising a plurality of walls extending away from the other surface of said plate-like portion and defining an open ended receptacle for receiving and supporting a terminal member, said plurality of walls including a pair of spaced apart walls each having outwardly extending slots, said outwardly extending slots having opposed surfaces configured to receive a magnet wire and to support the magnet wire in an inwardly directed slot in the terminal member for making good electrical contact between the magnet wire and the terminal member, one of said outwardly extending slots extending outwardly beyond the terminal member and defining the facing surfaces for engaging the lead wire in an interference fit.

9. A molded end coil insulator structure as defined in claim 8 wherein the opposed surfaces of said one of said slots defines an enlarged opening outwardly of said facing surfaces for guiding the lead wire into said slot and between said facing surfaces.

10. A molded end coil insulator structure as defined in claim 9 wherein said molded body comprises fiber reinforced thermoplastic polyester material.

11. A molded end coil insulator structure for use with a ferromagnetic coil formed by a series of laminations of ferromagnetic material fixed together to define a pair of end faces and a series of pole pieces with openings therebetween surrounding a central axis, said molded end coil insulator structure being designed for attachment to either end face of the core and forming part of the ground insulation for magnet wires wound thereabout and about the pole pieces, said molded end coil insulator structure comprising a molded body including a plate-like portion having a surface for engaging either end face of the core in good heat transfer relationship therewith, said plate-like portion defining openings for aligning with the openings in the core and solid portions in the configuration of the pole pieces for overlying the pole pieces when the molded body is in engagement with either of the end faces of the core, said molded body including a terminal support for retaining a terminal member in good electrical contact with a magnet wire and for gripping a lead wire from an external circuit which is also in good electrical contact with the terminal member, said molded body including means for maintaining the magnet wire wound about the pole pieces in a predetermined disposition relative to the central axis of the core, said molded body further including means for positively restraining crossover sections of magnet wire extending between the pole pieces, said molded body also including guide pins extending outwardly from the surface on the plate-like portion which engages an end face of the core, said guide pins being dimensioned to engage recesses in the end face in an interference fit, and a recess in said surface of said plate-like portion surrounding each of said guide pins disposed for collecting and retaining shavings due to the interference fit of said guide pins with the recesses in the core, thus minimizing any such shavings from interfering with the good heat transfer relationship of said surface with the end face of the core.

12. A molded end coil insulator structure for use with a ferromagnetic core formed by a series of laminations of ferromagnetic material fixed together to define a pair of end faces and a series of pole pieces with openings therebetween surrounding a central axis, said molded end coil insulator structure being designed for attachment to either end face of the core and forming part of the ground insulation for magnet wires wound thereabout and about the pole pieces, said molded end coil insulator structure comprising a molded body including a plate-like portion having a surface for engaging either end face of the core in good heat transfer relationship therewith, said plate-like portion defining openings for aligning with the openings in the core and solid portions in the configuration of the pole pieces for overlying the pole pieces when the molded body is in engagement with either of the end faces of the core, said molded body including a terminal support for retaining a terminal member in good electrical contact with a magnet wire and for gripping a lead wire from an external circuit which is also in good electrical contact with the terminal member, said molded body including means for maintaining the magnet wire wound about the pole pieces in a predetermined disposition relative to the central axis of the core, said molded body further including means for positively restraining crossover sections of magnet wire extending between the pole pieces, said molded body also including one or more retaining members extending inwardly from the openings in said plate-like portion to retain insulating sheets disposed in the openings in the core against accidental dislodgment from the core, said molded body further including guide pins extending outwardly from the surface on the plate-like portion which engages an end face of the core, said guide pins being dimensioned to engage recesses in the end face in an interference fit, and a recess in said surface of said plate-like portion surrounding each of said guide pins disposed for collecting and retaining shavings due to the interference fit of said guide pins with the recesses in the core, thus minimizing any such shavings from interfering with the good heat transfer relationship of said surface with the end face of the core.

13. A molded end coil insulator structure for use with a ferromagnetic core formed by a series of laminations of ferromagnetic material fixed together to define a pair of end faces and a series of pole pieces with openings therebetween surrounding a central axis, said molded end coil insulator structure being designed for attachment to either end face of the core and forming part of the ground insulation for magnet wires wound thereabout and about the pole pieces, said molded end coil insulator structure comprising a molded body including a plate-like portion having a surface for engaging either end face of the core in good heat transfer relationship therewith, said plate-like portion defining openings for aligning with the openings in the core and solid portions in the configuration of the pole pieces for overlying the pole pieces when the molded body is in engagement with either of the end faces of the core, said molded body including a terminal support for retaining a terminal member in good electrical contact with a magnet wire and for gripping a lead wire from an external circuit which is also in good electrical contact with the terminal member, said molded body including means for maintaining the magnet wire wound about the pole pieces in a predetermined disposition relative to the central axis of the core, said molded body further including means for positively restraining crossover sections of magnet wire extending between the pole pieces, said molded body further comprising a tubular member extending outwardly of said plate-like portion for surrounding and guiding a case bolt which passes through the end coil insulator structure and the core, said means for gripping and guiding crossover wires comprising a lip extending away from said plate-like portion and spaced apart from an external wall of said tubular member and forming therewith a slot for restraining crossover magnet wires disposed between the pole pieces.

14. A molded end coil insulator structure for use with a ferromagnetic core formed by a series of laminations of ferromagnetic material fixed together to define a pair of end faces and a series of pole pieces with openings therebetween surrounding a central axis, said molded end coil insulator structure being designed for attachment to either end face of the core and forming part of the ground insulation for magnet wires wound thereabout and about the pole pieces, said molded end coil insulator structure comprising a molded body including a plate-like portion having a surface for engaging either end face of the core in good heat transfer relationship therewith, said plate-like portion defining openings for aligning with the openings in the core and solid portions in the configuration of the pole pieces for overlying the pole pieces when the molded body is in engagement with either of the end faces of the core, said molded body including a terminal support for retaining a terminal member in good electrical contact with a magnet wire and for gripping a lead wire from an external circuit which is also in good electrical contact with the terminal member, said molded body including means for maintaining the magnet wire wound about the pole pieces in a predetermined disposition relative to the central axis of the core, said molded body further including means for positively restraining crossover sections of magnet wire extending between the pole pieces, said molded body including one or more retaining members means extending inwardly from the openings in said plate-like portion to retain insulating sheets disposed in the openings in the core against accidental dislodgment from the core, said molded body further comprising a tubular member extending outwardly of said plate-like portion for surrounding and guiding a case bolt which passes through the end coil insulator structure and the core, said means for gripping and guiding crossover wires comprising a lip extending away from said plate-like portion and spaced apart from an external wall of said tubular member and forming therewith a slot for restraining crossover magnet wires disposed between the pole pieces.

* * * * *

UNITED STATES PATENT AND TRADEMARK OFFICE
CERTIFICATE OF CORRECTION

PATENT NO. : 4,340,829
DATED : July 20, 1982
INVENTOR(S) : Billy R. McCoy

It is certified that error appears in the above-identified patent and that said Letters Patent are hereby corrected as shown below:

Column 10, line 5, change "coil" to --core--.

Signed and Sealed this

Nineteenth Day of October 1982

[SEAL]

Attest:

GERALD J. MOSSINGHOFF

Attesting Officer

Commissioner of Patents and Trademarks